United States Patent Office 3,053,755
Patented Sept. 11, 1962

3,053,755
HYDROCRACKING PROCESS WITH THE USE OF A SILICON OXIDE, ZIRCONIUM OXIDE AND TITANIUM OXIDE COMPOSITE CATALYST
Rowland C. Hansford, Fullerton, and Dean Arthur Young, Yorba Linda, Calif., assignors to Union Oil Company of California, Los Angeles, Calif., a corporation of California
No Drawing. Filed June 15, 1960, Ser. No. 36,156
16 Claims. (Cl. 208—110)

This invention relates to methods for the catalytic hydrocracking of high boiling hydrocarbon oils to produce therefrom lower boiling fractions such as gasoline. More particularly the invention concerns the use of certain novel catalysts for the hydrocracking, said catalysts being composed substantially exclusively of silica, zirconia and titania in intimate admixture.

The hydrocracking process itself consists in passing the high boiling feed stock in admixture with hydrogen over the catalyst at suitable temperatures, feed rates, pressures, etc. to effect a substantial conversion of the high boiling hydrocarbons to materials boiling in the gasoline range. Simultaneously, any organic sulfur and nitrogen compounds present in the feed are largely decomposed to hydrogen sulfide, ammonia and hydrocarbon fragments. Such hydrocracking processes are often referred to as destructive hydrogenation, or hydrogenolysis, although it will become apparent from the following discussion that the process based on the catalysts of the present invention is to be sharply distinguished from conventional hydrogenolysis, although it will become apparent from the following discussion that the process based on the catalysts of the present invention is to be sharply distinguished from conventional hydrogenolysis processes.

It is a principal object of this invention to provide efficient and selective catalysts for the hydrocracking of mineral oils, which will effect a maximum conversion to high quality gasoline-boiling range hydrocarbons, and a minimum of destructive degradation to products such as methane and coke. Another object is to provide active catalysts which are also thermally stable, and hence may be utilized for long periods of time, and may be regenerated by combustion when the activity declines. Another object is to provide optimum process conditions for the utilization of such catalysts. A further object is to provide hydrocracking catalysts which are more economical than previously utilized catalysts. A still further object is to provide methods for effectively desulfurizing and denitrogenating high boiling feed stocks. A specific object is to provide catalysts which are effective for the hydrocracking of such highly refractory stocks as cycle oils from conventional thermal or catalytic cracking, whereby additional conversion to gasoline may be obtained. Other objects and advantages will be apparent from the description which follows.

It is well known that the cracking of petroleum stocks, such as virgin gas oils from any type of crude oil, invariably leads to the production of a considerable proportion of a fraction which boils in the same range as the initial charge stock, but which is much more refractory toward further cracking. This is true whether the cracking process is non-catalytic or catalytic, and as a result there are definite limitations on the degree to which profitable recycling of this fraction to the cracking operation can be practiced. The effect of increased refractoriness of the "unconverted" portion of a cracking stock is particularly limiting in the case of catalytic cracking, so much so that only small recycle ratios are generally employed, further conversion of the recycle stock often being effected in a subsequent thermal cracking operation. Recycling to extinction invariably results in poor selectivity of the conversion to gasoline as a result of excessive formation of carbonaceous catalyst deposits and of light hydrocarbon gases. This is also true in thermal cracking, except that instead of carbonaceous catalyst deposits a large amount of heavy tar of high carbon content is formed.

The refractoriness of cracked recycle stocks is the result, principally, of the formation of polynuclear aromatic hydrocarbons through reactions of dehydrogenation, hydrogen transfer, cracking, cyclization, or condensation. It is well known, for example, that recycle stocks from catalytic cracking have a high content of methylnaphthalenes. These may be formed by the cracking of long side-chains or of saturated rings attached to a naphthalene nucleus, by the dehydrogenation of polynuclear naphthenes or aromatic-naphthenes such as alkyl-tetralins, and even by the polymerization and cyclization of olefins produced from saturated hydrocarbons or alkyl side-chains. In thermal cracking, one important mechanism of polynuclear aromatic hydrocarbon formation is the condensation of diolefins with aromatics of lower ring content.

In catalytic cracking, another important factor leading to apparent refractoriness is the accumulation of pyridine- or quinoline-type compounds in the recycle stock. These basic nitrogen compounds exert a temporary poisoning effect on the acidic catalyst centers, and low conversion of the cycle stock results.

The above-noted difficulties are avoided or minimized by the process herein described. Thus, by preventing complete dehydrogenation of polynuclear naphthenes to polynuclear aromatics, by hydrogenating at least partially the polynuclear aromatics already present in the charge stock, by preventing high olefin or diolefin content with subsequent reactions of polymerization, cyclization, or condensation, and by decomposing basic nitrogen compounds to innocuous ammonia, relatively high partial pressures of hydrogen can permit a maximum theoretical conversion of heavy hydrocarbons of all types to hydrocarbons boiling in the desired gasoline range. A process which, in a single step, employs sufficient hydrogen to cause an appreciably greater conversion of any higher boiling hydrocarbon mixture to gasoline than is possible in one step by conventional catalytic or non-catalytic cracking processes is termed "Hydrocracking" for the purposes of this description of invention. In all cases such a process will depend on the use of a suitable catalyst which not only promotes cracking but also activates molecular hydrogen to such an extent that hydrogen will enter into the cracking at some stage, presumably in the very initial stages, though there may not necessarily be a net consumption of hydrogen.

From the above discussion it will be apparent that the catalysts of the present invention may be used advantageously in the hydrocracking of virgin gas oils, whereby greater conversion to gasoline is obtained in a once-through operation than would be obtained in a similar once-through operation in conventional cracking processes, and also the "unconverted" fraction is not greatly degraded with respect to refractoriness, and may hence be recycled substantially to extinction. It will be apparent also that the catalyst may be employed to treat the refractory residues from conventional cracking operations whereby a substantial yield of high quality gasoline is obtained. The residue from this operation may likewise be recycled either to the hydrocracking step or back to a conventional cracking step in the absence of hydrogen. These results are not obtainable when treating such recycle stocks with a conventional silica-alumina catalyst; hydrogen is practically without effect on the cracking of such stocks with this catalyst.

The hydrocracking conditions employed herein involve passing the vaporized hydrocarbons over the finished catalyst at temperatures ranging between about 600° and 950° F., hydrogen pressures above about 100 p.s.i.g., preferably between about 500 and 5000 p.s.i.g., and space velocities ranging between about 0.1 and 10.0. The preferred hydrogen ratios may range between about 1000 and 10,000 s.c.f. per barrel of feed. The minimum hydrogen pressure of about 500 p.s.i.g. is critical herein when treating highly refractory, aromatic cycle stocks; at lower pressures dehydrogenation is favored, resulting in increased aromaticity and refractoriness of the stock. The optimum conditions herein defined are adapted to effect partial hydrogenation of fused-ring aromatic hydrocarbons to more highly saturated ring compounds, which are in turn more readily cracked to produce ultimately monocyclic aromatic hydrocarbons and low-boiling paraffins.

It is well known in the art that combinations of silica with certain transitional or non-transitional metal oxides are useful catalysts for the pyrolysis of hydrocarbons at elevated temperatures in the absence of added hydrogen. Composites of silica and zirconia are specifically known in such uses. Zirconia in fact appears to be the only transitional metal oxide which is known to form an active cracking catalyst with silica. However, none of these silica composites has been regarded as possesing any significant hydrogenating activity.

This picture has changed recently however, as a result of our previous discovery that silica-zirconia composites possess significant hydrogenating-cracking activity (application Serial No. 735,691, filed May 16, 1958, now abandoned), and are useful hydrocracking catalysts.

It is generally believed that cracking catalysts owe their activity to the presence of acidic centers on the catalyst surface, since it is known that active cracking catalysts exhibit acidic properties and that many of the reactions which occur in catalytic cracking are typical of acid-catalyzed reactions. Thomas (Industrial and Engineering Chemistry, vol. 41, pages 2564–73 (1949)), has reviewed the known cracking catalysts and has shown that all of these will have acidic properties if certain structural conditions are fulfilled. The best known cracking catalysts are silica-alumina, silica-magnesia, silica-zirconia, and silica-alumina-zirconia. In addition to these, alumina-boria and titania-boria are known to be active cracking catalysts.

Although titania is often considered to be more or less equivalent to zirconia, since titanium and zirconium are members of the group IV B elements of the periodic table, Thomas has shown that silica-titania compositions are not equivalent to silica-zirconia compositions as cracking catalysts because titanium exhibits a different coordination number than does zirconium in the solid structure of their respective oxides. Apparently, titanium always has a coordination number of six in its several oxides, while zirconium has a coordination number of eight in its one stable oxide. A six-coordinated oxide in combination with four-coordinated silica cannot exhibit strong acid properties according to the theory developed by Thomas and others. Experience has shown that silica-titania compositions prepared by methods analogous to those employed in the preparation of silica-alumina, silica-magnesia, and silica-zirconia catalysts are indeed inactive as cracking catalysts under the conditions normally employed in commercial catalytic cracking.

The picture in regard to silica-titania catalysts has also changed however, as a result of our recent discovery that such composites are even more active than silica-zirconia as hydrocracking catalysts (application Serial No. 502,232, filed April 18, 1955), now U.S. Patent No. 2,873,246. It was found further however that the silica-titania compositions were not as stable thermally as were the less active silica-zirconia composites.

It has now been found that by intimately compounding all three of the ingredients, silica, titania and zirconia within certain optimum proportions, catalyst compositions are obtained which are (1) more heat-stable than silica-titania compositions, (2) at least substantially equal in heat-stability to silica-zirconia compositions, and in some cases more heat-stable, (3) more active than silica-zirconia compositions, and (4) at least substantially equal in activity to silica-titania compositions, and in some cases more active.

The term "heat-stable" as employed herein refers to the resistance of the active, amorphous compositions toward the formation of definite crystalline phases under the influence of prolonged heating and/or high temperatures. The formation of such crystalline phases has been found to parallel roughly the decline in intrinsic activity of the catalysts, i.e. the decline which is not attributable to extrinsic factors such as fouling with coke or other poisons. The term "activity" refers to the ability of the catalyst to promote the formation of gasoline from higher boiling materials under the described hydrocracking conditions. This "activity" factor has two counter-parts: over-all ability to promote the hydrogenative scission of hydrocarbons under hydrogen pressure, and specific selectivity for promoting the formation of gasoline in preference to undesired materials such as coke, methane, ethane, propane and the like.

The catalyst compositions found to be most useful herein comprise those which contain between about 5% and 75% of silica, between about 5% and 75% zirconia, and between about 5% and 75% of titania, all proportions being by weight on a dry basis. The preferred compositions are those wherein zirconia and titania comprise the major portion of the catalyst, silica being the minor component. The high-silica compositions are generally quite heat stable but the catalysts containing more than about 50% by weight of silica are in general less active than those containing lesser proportions. The catalysts containing less than about 10% of silica may be initially quite active, but are not sufficiently heat stable for most practical purposes. The optimum proportions of ingredients are roughly equi-molar; i.e. the equi-molar compositions appear to exhibit the optimum combination of activity, selectivity, and heat stability. The highest activity is exhibited by those compositions containing more than 15% of titania, and more than 15% of zirconia. The greatest heat stability is exhibited by those compositions which contain less than about 65% of titania. For all these reasons the preferred catalyst compositions embrace those composed as follows:

| Component: | Optimum weight percent |
| --- | --- |
| Silica | 10–50 |
| Titania | 15–65 |
| Zirconia | 15–65 |

In the preparation of active silica-zirconia-titania catalysts it is essential that the three components be extremely intimately mixed, such as is achieved by coprecipitation of $SiO_2$, $TiO_2$ and $ZrO_2$. Such catalysts may be prepared by any method which provides a sufficiently intimate association of the components. Molecular subdivision and distribution of the components in an amorphous, activated gel structure is preferred. Suitable methods for obtaining such composites include for example: (1) the impregnation of a hydrogel or adsorbent gel of one component, or of a mixture of two components, with a solution or hydrosol of the other component or components, followed by drying and calcining; (2) coprecipitation of all three components from a solution or solutions of soluble compounds thereof, followed by drying and calcining; (3) coprecipitation of two of the components from a solution or solutions of soluble compounds thereof, followed by impregnation of the two-component gel with the third component, followed by drying and calcining. Any other method may be employed which provides a sufficiently intimate association of the components. It is to be noted the methods employing impregnation (methods 1 and 3) are feasible only where the materials added by impregnation are to make up a minor portion, e.g., 5–20% by weight of the finished catalyst.

Practical experience has demonstrated that by far the most desirable method for preparing the catalyst is coprecipitation of all three components from an aqueous solution. The catalysts prepared by this method are found to exhibit considerably higher activity than those prepared by other methods, and they are in general more heat stable.

One method of effecting coprecipitation involves forming an aqueous solution of acidic compounds of all three components, e.g. fluosilicic acid, zirconyl chloride, and titanium tetrachloride, and mixing the solution with a suitable alkali such as ammonium hydroxide, thereby to effect a precipitation of the hydrous oxides of silica, titania and zirconia. The precipitate is then removed by filtration, washed exhaustively to remove contaminating ions, dried and calcined.

Another and preferred coprecipitation process may be carried out by forming an aqueous solution of sodium silicate containing excess alkali such as ammonium hydroxide, and mixing the alkaline silicate with a second solution of soluble, acidic titanium and zirconium salts, e.g. zirconium sulfate and titanium sulfate.

Any sutiable soluble salts or hydrosols of silica, zirconium and titanium may be employed in the above or other coprecipitation methods. The general objective is to obtain an intimate mixture of the hydrous oxides, or of insoluble compounds which may be transformed to the oxides upon calcining. Suitable materials for preparing coprecipitated composites include for example zirconyl chloride, zirconyl bromide, zirconyl iodide, zirconium sulfate, zirconium acetate, titanium tetrafluoride, titanium tetrachloride, titanium tetrabromide, titanium tetraiodide, titanium sulfate (e.g. $TiOSO_4 \cdot H_2SO_4 \cdot 8H_2O$), titanium oxalate, sodium silicate, potassium silicate, fluosilicic acid, silica hydrosols, and the like. The zirconyl halides listed above may be formed in situ by adding to water the corresponding tetra-halide of zirconium.

In one modification, a mixture of crude silica, titania (rutile or anatase), and zirconia may be digested with hydrofluoric acid until all three components are dissolved, and the resulting solution then neutralized with alkali, thereby precipitating the mixed hydrogels. In another modification mixtures of crude titania and zirconia may be digested with acids, e.g. sulfuric or hydrofluoric, until dissolved, and the resulting solution mixed rapidly with a sodium silicate solution containing sufficient excess alkali to neutralize the free acid, thereby precipitating hydrous silica, titania and zirconia.

It should be noted that all three of the hydrous oxides are generally coprecipitable over the pH range from about 3 to 12.

The coprecipitated gels prepared by any of the above methods are recovered as by filtration or the like, washed exhaustively, dried and calcined, at e.g. 500–1500° F. for 1 to 24 hours. If the hydrous gels are contaminated with alkali metals, it is preferable to leach with ammonium sulfate or ammonium chloride solutions to replace the alkali metal with volatile ammonium salts which are vaporized during calcining.

An important consideration in preparing the coprecipitated gels involves the hydrogen ion concentration of the aqueous medium in and surrounding the immediate zone of precipitation. It has been found that when alkaline sodium silicate solutions are stirred gradually into a large volume of acidic titanium and zirconium compounds, whereby the precipitation occurs in a predominantly acidic environment, the resulting catalysts are generally much less active than those prepared by gradually stirring the acid salt solutions into a large volume of alkaline silicate. In the latter case, the precipitation occurs in an environment which is largely alkaline. It is therefore preferred that the coprecipitation be carried out under conditions such that the major environment is one of alkalinity, i.e. at a pH between about 6 and 12. Repeated experiments have demonstrated that catalysts prepared by coprecipitating in acid environment, i.e. at a pH between about 2 and 6, are initially substantially less active than catalysts of the same nominal composition precipitated from alkaline solutions. The most practical method presently contemplated for obtaining controlled alkaline precipitation involves the simultaneous mixing in a small surge zone of a stream of acidic solution of zirconium and titanium salts with a stream of alkaline silicate solution containing sufficient excess alkali to neutralize the acid salt solution. The flow rates of the respective streams are controlled so as to provide a substantially constant pH in the mixing zone. However, any other practical method may be utilized which effectively maintains the precipitating environment under alkaline conditions during precipitation.

While the effect of pH during precipitation is not completely understood, it is found that the catalysts prepared under alkaline conditions exhibit a substantially higher surface area and pore volume than those prepared under acid conditions, which factors would appear to account in large part for their improved activity. Thus, in one series of catalyst preparations by coprecipitation, the following surface area and pore volume characteristics of the pelleted catalysts were found:

TABLE 1

| Catalyst | Composition, weight percent | | | pH of pptn. | Surface area, m.²/gm. | Pore volume, ml./gm. |
| --- | --- | --- | --- | --- | --- | --- |
| | $SiO_2$ | $ZrO_2$ | $TiO_2$ | | | |
| A | 23 | 47 | 30 | 5.0 | 111 | 0.306 |
| B | 23 | 47 | 30 | 8.5 | 191 | 0.481 |
| C | 50 | 20 | 30 | 5.0 | 189 | 0.295 |
| D | 50 | 20 | 30 | 8.5 | 200 | 0.468 |

Catalysts B and D exhibit a substantially greater hydrocracking activity than catalysts A and C, respectively. It is therefore preferred to utilize catalysts having a pore volume in excess of about 0.3 ml. per gm. of catalyst pellet.

It has been found also that the coprecipitated catalysts prepared from the sulfate salts of zirconium and titanium are somewhat more active than the compositions prepared from the halide salts. It is therefore preferred to utilize the soluble sulfates of zirconium and titanium.

In any of the above preparation methods, the catalyst may be formed into pellets or granules at various stages in the manufacture. The moist powders may be compressed or extruded to form pellets prior to calcining, or the calcined, powdered gels may be compressed to form the desired pellets. Ordinarily it is desirable to employ the catalyst in the form of pellets or granules ranging in size from about ⅛ inch to ½ inch in diameter. In forming such pellets it may be desirable to employ minor proportions of binders such as hydrogenated corn oil or the like, and in case the dry materials are to be pelleted, a small proportion, e.g., 1–2% by weight, of graphite may be incorporated therein to act as a lubricant. The binders and lubricants, if employed, are removed by combustion during the final calcining. Those skilled in the art will readily appreciate that other compounding and pelleting procedures may be employed.

The above catalysts may be utilized for hydrocracking a great variety of mineral oil feed stocks, which are generally high boiling fractions derived from petroleum stocks, shale oils or tar sands. The catalysts are especially useful for hydrocracking coker gas oils, refractory cycle stocks from conventional cracking operations, or alternatively they may be used for hydrocracking virgin gas oils to prevent the buildup of refractory residues from the cracking operation. Any of these feed stocks may also contain organic sulfur in amounts up to about 4% by weight, and organic nitrogen in amounts up to about 1% by weight. In the hydrocracking process these sulfur and nitrogen compounds are largely decomposed.

The following examples are cited to illustrate the effectiveness of the herein described catalysts for hydrocracking, but such examples should not be construed as limiting in scope:

*Example I*

A series of coprecipitated catalysts, each containing silica and one or more of the components zirconia, and titania was prepared by neutralizing ammoniacal sodium silicate solutions with appropriate proportions of acidic solutions containing varying proportions of zirconium sulfate ($Zr(SO_4)_2 \cdot 4H_2O$), titanium tetrachloride, or both. The overall proportions of the salts utilized were such as to give the desired ratio of silica, zirconia and/or titania in the finished catalyst. The method of precipitating involved adding the acidic zirconium and/or titanium solution gradually with stirring to the ammoniacal sodium silicate solution containing sufficient ammonia exactly to neutralize the acidic salt solution when completely added. The resulting coprecipitation occurred at a pH ranging from about 12 to 6. Other catalysts were prepared by the reverse order of addition with results as indicated below.

The mixed hydrogels from the above coprecipitations were filtered from the solutions, partially dried, washed with an aqueous ammonium sulfate solution to remove zeolitic sodium, washed with water until free of sulfate, dried, pulverized and formed into ⅛" pellets. The pellets were then calcined at 900° F. for 18 hours.

Pure zirconia and titania gels were prepared by precipitation with ammonia from aqueous solutions of zirconyl chloride or titanium tetrachloride, followed by washing, drying and calcining.

The catalysts prepared as outlined were then tested for hydrocracking activity employing a refractory cycle stock from a commercial catalytic cracking operation, representing a relatively difficult stock for conversion to gasoline by conventional catalytic cracking processes. This stock had the following characteristics:

| | |
|---|---|
| API gravity at 60° F. | 21.3° |
| ASTM distillation end point °F | 673 |
| Vol. percent 400° F. end-point gasoline | 2.1 |
| Wt. percent sulfur | 0.92 |
| Wt. percent nitrogen | 0.14 |
| Vol. percent aromatics | 62 |
| Vol. percent olefins | 5 |
| Vol. percent saturates | 33 |

The processing conditions employed were as follows:

| | |
|---|---|
| Temperature °F | 900 |
| Pressure p.s.i.g | 1000 |
| L.H.S.V. | 0.5 |
| $H_2$/liquid feed s.c.f./bbl | 8000 |
| Length of runs hours | 6 |

The results of the various runs were as follows:

TABLE 2

| Catalyst | | | | Gasoline yield, vol. percent of feed | | Average Selectivity [3] |
|---|---|---|---|---|---|---|
| No. | Composition, weight percent | | | Avg.[1] | Max.[2] | |
| | $SiO_2$ | $ZrO_2$ | $TiO_2$ | | | |
| 1 | 0 | 100 | 0 | 19 | 21 | 64 |
| 2 | 10 | 90 | 0 | 35 | 36 | 77 |
| 3 [4] | 20 | 80 | 0 | 37 | 39 | 67 |
| 4 | 20 | 80 | 0 | 40 | 51 | 76 |
| 5 [4] | 20 | 70 | 10 | 28 | 28 | 95 |
| 6 | 20 | 70 | 10 | 41 | 48 | 83 |
| 7 | 20 | 60 | 20 | 55 | 72 | 80 |
| 8 | 20 | 50 | 30 | 59 | 74 | 95 |
| 9 | 20 | 40 | 40 | 53 | 74 | 68 |
| 10 | 20 | 30 | 50 | 49 | 70 | 76 |
| 11 | 20 | 20 | 60 | 67 | 71 | 81 |
| 12 | 20 | 10 | 70 | 37 | 61 | 57 |
| 13 | 20 | 0 | 80 | 59 | 76 | 78 |
| 14 | 10 | 0 | 90 | 54 | 65 | 78 |
| 15 | 0 | 0 | 100 | 25 | 34 | 80 |
| 16 | 50 | 30 | 20 | 43 | 56 | 77 |

[1] Average for full six-hour run.
[2] Product from first hour of run.
[3] Selectivity = $\frac{\text{vol. percent gasoline yield}}{100-\text{vol. \% liquid residue}} \times 100$
[4] Catalysts coprecipitated over pH range from about 0 to 7; others coprecipitated over range from about 12 to 6.

From the foregoing data it will be apparent that the three-component catalysts 5 through 12 and 16 are in general substantially more active than either the single component or the two component silica-zirconia catalysts, in terms of average gasoline yields. The selectivity of the three-component catalysts is also in most cases superior to the two-component catalysts. Although the silica-titania catalysts 13 and 14 were quite active, their thermal stability was found to be lower than that of the three-component catalysts, as will be shown in Example II. Catalysts 3 and 5, which were coprecipitated in an acid environment by pouring the ammoniacal sodium silicate into the acid solution of zirconium and titanium, are substantially less active than corresponding catalysts 4 and 6 respectively, which were precipitated in an alkaline environment by pouring the acidic zirconium-titanium solution into the ammoniacal sodium silicate. In the case of catalyst 5 however, the high selectivity indicates that under more severe processing conditions the gasoline yield could be increased without unduly impairing the selectivity.

In addition to the data reported in Table 2, it was found that the products from the hydrocracking runs were substantially desulfurized and denitrogenated. For the preferred catalysts 6 through 12, it was found that desulfurization was from 69% to 96% complete, and denitrogenation was from 75% to 98% complete.

*Example II*

The thermal stability of the above catalysts was determined by three different methods:

The first method was by differential thermal analysis (DTA). In this method, which is widely used in the analysis of materials such as clays, the sample is heated in a furnace at a constant rate of temperature increase from room temperature to 1000° C. (1832° F.). The temperature of the sample is compared continuously with that of a sample of alundum adjacent to it in the furnace. Alundum does not undergo any phase changes over this temperature range and is a convenient reference against which to detect any temperature differential occurring in the sample due to transformation involving absorption or evolution of thermal energy. One such transformation in catalysts is the crystallization of one or more components which before heating are amorphous. Generally such a transformation involves a strong evolution of heat at some critical temperature. The higher this critical temperature, the more thermally stable is the catalyst as a general rule.

In the second method for testing the catalysts the samples were heated in a muffle for 18 hours at 1200° F., after which the samples were removed and subjected to analysis by X-ray diffraction. The resulting diffraction patterns indicate the type and degree of crystallization which occurred during heating.

In the third method, the samples were heated in the muffle for 18 hours at 1400° F., and were then again subjected to X-ray diffraction analyses.

The results of the various stability tests on the catalysts of Example I were as follows:

TABLE 3

| Catalyst No. | Composition, weight percent | | | DTA transition, °F. | Cryst. phase [1] after 18 hrs. at 1,200° F. | Cryst. phase [1] after 18 hrs. at 1,400° F. |
|---|---|---|---|---|---|---|
| | $SiO_2$ | $ZrO_2$ | $TiO_2$ | | | |
| 1 | 0 | 100 | 0 | [2] 1,202 | | Tetr. $ZrO_2$, m.s. |
| 2 | 10 | 90 | 0 | 1,409 | Tetr. $ZrO_2$, f | Tetr. $ZrO_2$, m. |
| 4 | 20 | 80 | 0 | 1,494 | Amorphous | Tetr. $ZrO_2$, m. |
| 6 | 20 | 70 | 10 | 1,530 | ----do---- | Tetr. $ZrO_2$, m. |
| 7 | 20 | 60 | 20 | 1,476 | ----do---- | Tetr. $ZrO_2$, v.w. |
| 8 | 20 | 50 | 30 | 1,458 | ----do---- | Tetr. $ZrO_2$, w., Anatase, v.w. |
| 9 | 20 | 40 | 40 | 1,427 | ----do---- | Do. |
| 10 | 20 | 30 | 50 | 1,382 | ----do---- | Tetr. $ZrO_2$, v.w., Anatase, w. |
| 11 | 20 | 20 | 60 | 1,324 | ----do---- | Anatase, m. |
| 12 | 20 | 10 | 70 | 1,238 | Anatase, v.f | |
| 13 | 20 | 0 | 80 | 1,121 | | |
| 14 | 10 | 0 | 90 | [3] None | | |
| 15 | 0 | 0 | 100 | 671 | Anatase, s | |
| 16 | 50 | 30 | 20 | 1,504 | | |

[1] As determined by X-ray diffraction analysis; relative intensity of diffraction patterns is indicated as: very faint (v.f.), faint (f.), very weak (v.w.), weak (w.), medium (m), medium strong (m.s.), and strong (s).
[2] Monoclinic $ZrO_2$ crystals formed.
[3] No distinct break observed in DTA record, although crystallization did occur.

The above data for DTA transition temperatures indicate that maximum stability is obtained at catalyst #6 containing 10% titania, and catalysts 7 through 12 and 16 also display high transition temperatures.

The 18 hour heat treatment, however, tended to indicate that the maximum stability is exhibited by catalyst 8, and this catalyst is also the most active of the three-component catalysts, on the basis of initial activity. It would thus appear from the activity data and the thermal analysis data that those catalysts containing between about 10% and 65% by weight of titania display the optimum combination of stability and activity for practical purposes.

*Example III*

To compare the effect of pH during precipitation, three catalysts were prepared as follows: Catalyst A by adding the acidic solution of zirconium sulfate and titanium tetrachloride with stirring to the ammoniacal sodium silicate solution, resulting in coprecipitation over a pH range of about 12 to 7; catalyst B by continuously mixing two streams of approximately acid-base-equivalent proportions of the two solutions, resulting in coprecipitation at a relatively constant pH of about 6.5; catalyst C by adding the alkali-silicate solution to the zirconium-titanium solution, resulting in coprecipitation over a pH range of about 1 to 7.5. The three catalysts were then finished as described in Example I and compared for hydrocracking activity under the same conditions. The results were as follows:

TABLE 4

| pH of precipitation | Catalyst, weight percent | | | Gasoline yield, vol. percent of feed | | Selectivity |
|---|---|---|---|---|---|---|
| | $SiO_2$ | $ZrO_2$ | $TiO_2$ | Avg. | Max. | |
| A | 12–7 | 20 | 50 | 30 | 59 | 64 | 85 |
| B | 6.5 | 20 | 50 | 30 | 53 | 65 | 80 |
| C | 1–7.5 | 23 | 47 | 30 | 44 | 53 | 72 |

These data demonstrate clearly the marked effect of hydrogen-ion concentration during precipitation of the hydrous gels.

*Example IV*

This example further illustrates the effect of pH during precipitation. Two catalysts, each containing 20% $SiO_2$, 50% $ZrO_2$, and 30% $TiO_2$ by weight, were prepared from identical reagents at two different pH levels. Each preparation was made by mixing a sodium silicate solution with a zirconium sulfate-titanyl sulfate solution in a vessel containing a stirred aqueous buffer solution. The silicate solution contained 0.0833 ml. of "N" Brand sodium silicate and 0.358 ml. of 28% ammonia solution per milliliter. The second solution contained 0.0833 g. $ZrO_2$ (as $Zr(SO_4)_2 \cdot 4H_2O$) and 0.050 g. $TiO_2$ (as $$TiOSO_4 \cdot H_2SO_4 \cdot 8H_2O$$

per milliliter. When equal volumes of these two solutions were mixed the resulting pH was 7.

To effect coprecipitation at the desired pH level the two solutions were each allowed to flow at the same rate into the appropriate buffer solution. In one case this was a 1 N. $NH_4OH$ solution, giving an effective pH of about 9 throughout the precipitation. In the second case, the buffer was a solution which was 0.1 N in the acetic acid and 0.1 N in ammonium acetate, producing a precipitation medium of pH=5.

The respective slurries were filtered, partially dried to facilitate subsequent base exchanging of sodium ion with ammonium sulfate and final washing to remove all soluble ions. The product was dried, pulverized, and pelleted. The pellets were calcined at 900° F. for about 16 hours.

Each catalyst was tested for hydrocracking activity in the conversion of the catalytic cycle oil under the following conditions:

Temperature _____ 850° F.
Pressure _____ 1500 p.s.i.g.
LHSV _____ 05.
$H_2$ Recycle _____ 8000 s.c.f. per bbl.

The catalyst prepared at a pH of 9 produced 65.1 volume percent of $C_4$-free gasoline in one pass during six hours on stream, based on the liquid feed. The second catalyst, prepared at a pH of 5, produced 56.2 volume percent of $C_4$-free gasoline on the same basis. The total conversion was, respectively, 82% and 62% by volume, or a selectivity of 79% and 91%, respectively.

It is clear that the catalyst prepared at the higher pH is considerably more active than the one prepared at the lower pH. However, under the conidtions used, the low pH catalyst is more efficient. Advantage may be taken of the higher activity of the high pH catalyst by operating under milder conditions, e.g., at higher space velocity.

*Example V*

Regenerability of the catalysts was investigated in a series of 6-hour hydrocracking runs, using in each successive run the regenerated catalyst from the preceding run. Regeneration was effected by heating the catalyst in the presence of air for about 16 hours at 900° F., followed by reduction in hydrogen at 900° F. The catalyst employed was one of the optimum 20% $SiO_2$—50% $ZrO_2$—30% $TiO_2$ alkaline-coprecipitated compositions, similar to catalyst No. 8 of Example I. The results in four successive runs under the process conditions of Example I were as follows:

TABLE 5

| Number of catalyst regenerations | Gasoline yield vol. percent of feed | | Selectivity |
|---|---|---|---|
| | Avg. | Max. | |
| Fresh | 63 | 92 | 83 |
| One | 54 | 63 | 80 |
| Two | 54 | 73 | 81 |
| Three | 55 | 70 | 82 |

This example shows that repeated regenerations do not impair the catalyst activity after an initial decline from the fresh activity. The F–1 clear octane number of the gasoline from these runs was found to be 93.6, and the F–1 leaded (3 ml. per gallon) rating was 99.4.

*Example VI*

In order to compare the activity of catalysts prepared from chloride and from sulfate salts, two additional catalysts were prepared, one (catalyst D) by coprecipitation of a titanium tetrachloride-zirconium sulfate solution with ammoniacal sodium silicate, and the other (catalyst E) by coprecipitation of a titanium sulfate $$(TiOSO_4.H_2SO_4 8H_2)$$

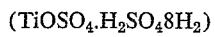

zirconium sulfate solution with ammoniacal sodium silicate. Both catalysts were coprecipitated at a substantially constant pH of about 9 by slowly pouring the aqueous zirconium-titanium solution simultaneously with the ammoniacal sodium silicate into an excess of 1 N ammonium hydroxide, with constant stirring. The resulting precipitates were filtered, washed and processed into catalyst pellets as described in Example I. The catalysts were then tested for hydrocracking activity under the conditions of Example I, with the following results:

TABLE 6

| | Catalyst, weight percent | | | Gasoline yield, vol. percent of feed | | Selectivity |
|---|---|---|---|---|---|---|
| | $SiO_2$ | $ZrO_2$ | $TiO_2$ | Avg. | Max. | |
| D | 20 | 50 | 30 | 60 | 84 | 74 |
| E | 20 | 50 | 30 | 64 | 83 | 77 |

Thus the catalysts prepared from titanium sulfate appear to be somewhat more active and selective than similar catalysts prepared from the chloride.

*Example VII*

A series of two-component catalysts was prepared by coprecipitation at different pH ranges by the general methods described in Example I. The resulting catalysts were tested for hydrocracking activity under the conditions of Example I, with the following results:

TABLE 7

| | Catalyst, weight percent | | | pH of precipitation | Gasoline yield, vol. percent of feed | Selectivity |
|---|---|---|---|---|---|---|
| | $SiO_2$ | $ZrO_2$ | $TiO_2$ | | | |
| F | 20 | 80 | | 10–7 | 40 | 76 |
| G | 20 | 80 | | 7 | 24 | 71 |
| H | 20 | | 80 | 10–7 | 59 | 78 |
| J | 20 | | 80 | 6 | 59 | 79 |

From these data it would appear that the pH of precipitation is significantly interrelated with the zirconia-silica components, but not with the titania-silica combination. The alkaline-precipitated (pH 6–12) silica-zirconia catalysts containing between about 10% and 50% by weight of silica are themselves found to be useful hydrocracking catalysts.

*Example VIII*

In order to show the activity of the catalysts under milder hydrocracking conditions, the two catalysts of Example IV were tested for hydrocracking the feed oil at a liquid hourly space velocity of 1.0, instead of 0.5, the other conditions being the same as in Example IV. The results were as follows:

TABLE 8

| pH of precipitation of catalyst | Avg. gasoline yield, vol. percent of feed | Selectivity |
|---|---|---|
| 5 | 35 | 100 |
| 9 | 48 | 95 |

The high pH catalyst is thus definitely more active under mild conditions than the low pH catalyst.

*Example IX*

In order to compare the above results with those obtainable from a known catalyst having high hydrogenation activity, a 2.9% CoO, 8.3% $MoO_3$, 84.4% $Al_2O_3$—4.4% $SiO_2$ catalyst was evaluated under exactly the same conditions. A yield of 32% by volume of gasoline and a recovery of 40% of a heavier fraction having an A.P.I. gravity of 18.1 were obtained. Thus, not only a lower activity is exhibited by this catalyst as compared to the catalyst of Example V, but the selectivity of 53% is the poorest of any catalyst tested.

This application is a continuation-in-part of application serial No. 539,681, filed October 10, 1955, and now abandoned.

From the above examples it will be apparent that the catalysts described herein exhibit surprisingly high activity for the hydrocracking of refractory cycle stocks and other heavy oils to produce high yields of high-octane gasoline and good desulfurization and denitrogenation of such oils. It is not intended that the invention should be restricted to the details disclosed in the examples or elsewhere, since many variations may be made by those skilled in the art without departing from the scope or spirit of the following claims.

We claim:

1. A process for hydrocracking a high-boiling hydrocarbon to produce lower boiling hydrocarbons which comprises contacting said high-boiling hydrocarbon with a hydrocracking catalyst in the presence of between about 1,000 and 10,000 s.c.f. of hydrogen per barrel of feed, and under hydrocracking conditions sufficient to effect hydrogenation and hydrogenolysis of said feed, said catalyst comprising as the essential active ingredient a coprecipitated composite of titanium oxide, zirconium oxide and silicon oxide prepared by coprecipitation of all three of said components from aqueous solution at a pH between about 6 and 12, each of said three components being present in proportions between about 5% and 75% by weight.

2. A process as defined in claim 1 wherein said high boiling hydrocarbon is a fused-ring aromatic hydrocarbon, and said hydrocracking conditions include a hydrogen pressure in excess of about 500 p.s.i.g.

3. A process for hydrocracking a mineral oil feed stock boiling above the gasoline range to produce gasoline-boiling range hydrocarbons which comprises contacting said feed stock with a hydrocracking catalyst in the presence of between about 1000 and 10,000 s.c.f of hydrogen per barrel of feed, and under hydrocracking conditions, said hydrocracking catalyst comprising as the essential active ingredient a coprecipitated composite of titanium oxide, zirconium oxide and silicon oxide prepared by coprecipitation of all three of said components from aqueous solution at a pH between about 6 and 12, each of said three components being present in proportions between about 5% and 75% by weight, said hydrocracking conditions comprising temperatures between about 600° and 950° F., hydrogen pressures between about 500 and 5,000 p.s.i.g., and space velocities between about 0.1 and 10.0 volumes of liquid feed per volume of catalyst per hour.

4. A process as defined in claim 3 wherein said feed stock is a highly aromatic residual oil from a cracking operation conducted in the absence of added hydrogen.

5. A process as defined in claim 3 wherein the silica content of said catalyst is between about 10% and 50% by weight, the zirconia content is between about 15% and 65% by weight, and the titania content is between about 15% and 65% by weight.

6. A process as defined in claim 3 wherein said catalyst is prepared by coprecipitation at a pH between about 6 and 12 of the hydrous oxides of titanium, zirconium and silicon from an aqueous solution of a soluble silicon compound, a soluble zirconium sulfate and a soluble titanium sulfate, followed by drying and calcining of the mixed hydrous oxides.

7. A process as defined in claim 3 wherein said catalyst is prepared by gradually pouring an acidic solution of zirconium and titanium salts into a large body of ammoniacal alkali silicate solution with agitation, whereby coprecipitation of the hydrous oxides of silicon, zirconium and titanium takes place at a pH between about 12 and 6, and thereafter drying and calcining the mixed hydrous oxides.

8. A process for hydrocracking and desulfurizing a mineral oil feed stock boiling above the gasoline range and containing at least about 0.1% sulfur in the form of organic sulfur compounds to produce gasoline-boiling range hydrocarbons of reduced sulfur content which comprises contacting said feed stock with a hydrocracking catalyst in the presence of between about 1000 and 10,000 s.c.f of hydrogen per barrel of feed, and under hydrocracking conditions, said hydrocracking catalyst comprising as the essential active ingredient a coprecipitated composite of titanium oxide, zirconium oxide and silicon oxide prepared by coprecipitation of all three of said components from aqueous solution at a pH between about 6 and 12, each of said three components being present in proportions between about 5% and 75% by weight, said hydrocracking conditions comprising temperatures between about 600° and 950° F., hydrogen pressures between about 500 and 5000 p.s.i.g., and space velocities between about 0.1 and 10.0 volumes of liquid feed per volume of catalyst per hour.

9. A process as defined in claim 8 wherein said feed stock is a residual oil rich in fused-ring aromatic hydrocarbons and is obtained as residue from a catalytic cracking operation conducted in the absence of added hydrogen at a temperature between about 800° and 1000° F.

10. A process as defined in claim 8 wherein said feed stock is a residual oil rich in fused-ring aromatic hydrocarbons and is obtained as residue from a thermal cracking operation conducted in the absence of added hydrogen at a temperature between about 850° and 1050° F.

11. A process for hydrocracking a mineral oil feedstock boiling above the gasoline range to produce gasoline boiling range hydrocarbons which comprises contacting said feedstock with a hydrocracking catalyst in the presence of between about 1000 and 10,000 s.c.f. of hydrogen per barrel of feed, and under hydrocracking conditions sufficient to effect hydrogenation and hydrogenolysis of said feed, said catalyst comprising as the essential active ingredient a coprecipitated composite of titanium oxide, zirconium oxide and silicon oxide prepared by coprecipitation of all three of said components from aqueous solution at a pH between about 6 and 12, each of said three components being present in proportions between about 5% and 75% by weight.

12. A process for hydrocracking a high-boiling hydrocarbon to produce lower boiling hydrocarbons which comprises contacting said high-boiling hydrocarbon with a hydrocracking catalyst in the presence of between about 1000 and 10,000 s.c.f. of hydrogen per barrel of feed, and under hydrocracking conditions sufficient to effect hydrogenation and hydrogenolysis of said feed, said catalyst comprising as the essential active ingredient a coprecipitated composite of titanium oxide, zirconium oxide and silicon oxide, each of said three components being present in proportions between about 5% and 75% by weight, the titania content being greater than 15% by weight.

13. A process for hydrocracking a mineral oil feed stock boiling above the gasoline range to produce gasoline-boiling range hydrocarbons which comprises contacting said feed stock with a hydrocracking catalyst in the presence of between about 1000 and 10,000 s.c.f. of hydrogen per barrel of feed, and under hydrocracking conditions, said hydrocracking catalyst comprising as the essential active ingredient a coprecipitated composite of titanium oxide, zirconium oxide and silicon oxide, each of said three components being present in proportions between about 5% and 75% by weight, the titania content being greater than 15% by weight, said hydrocracking conditions comprising temperatures between about 600° and 950° F., hydrogen pressures between about 500 and 5,000 p.s.i.g., and space velocities between about 0.1 and 10.0 volumes of liquid feed per volume of catalyst per hour.

14. A process as defined in claim 12 wherein said feed stock is a highly aromatic residual oil from a cracking operation conducted in the absence of added hydrogen.

15. A process as defined in claim 12 wherein the silica content of said catalyst is between about 10% and 50% by weight, the zirconia content is between about 15% and 65% by weight, and the titania content is between about 15% and 65% by weight.

16. A process for hydrocracking a mineral oil feed stock boiling above the gasoline range to produce gasoline boiling range hydrocarbons which comprises contacting said feed stock with a hydrocracking catalyst in the presence of between about 1000 and 10,000 s.c.f. of hydrogen per barrel of feed, and under hydrocracking conditions sufficient to effect hydrogenation and hydrogenolysis of said feed, said catalyst comprising as the essential active ingredient a coprecipitated composite of titanium oxide, zirconium oxide and silicon oxide prepared by coprecipitation of all three of said components from aqueous solution, each of said three components being present in proportions between about 5% and 75% by weight, the titania content being greater than 15% by weight.

References Cited in the file of this patent

UNITED STATES PATENTS 2,911,356   Hanson ---------------- Nov. 3, 1959